Jan. 4, 1966  N. LAING  3,227,902

ELECTRIC MOTOR COOLING MEANS

Filed March 7, 1963  4 Sheets-Sheet 1

INVENTOR
Nikolaus Laing
BY
ATTORNEYS

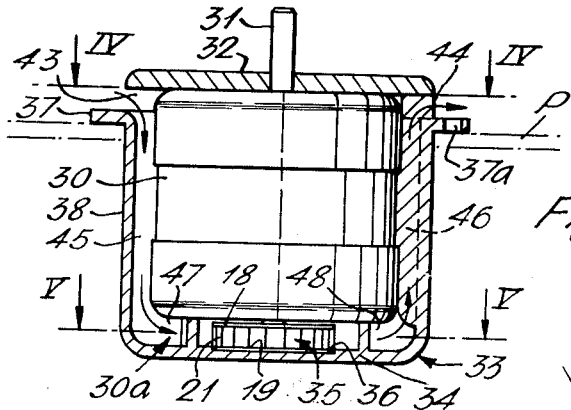
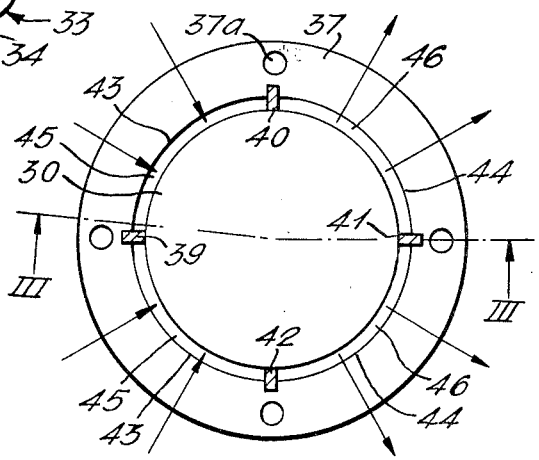
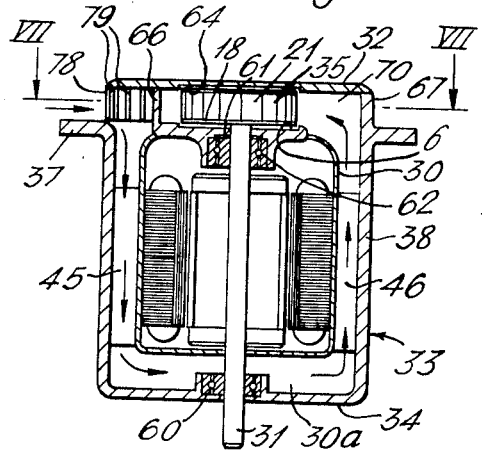
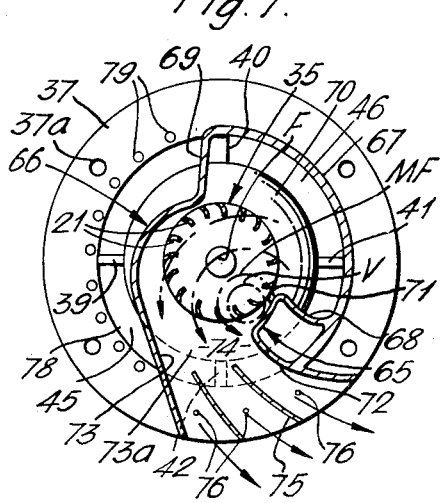

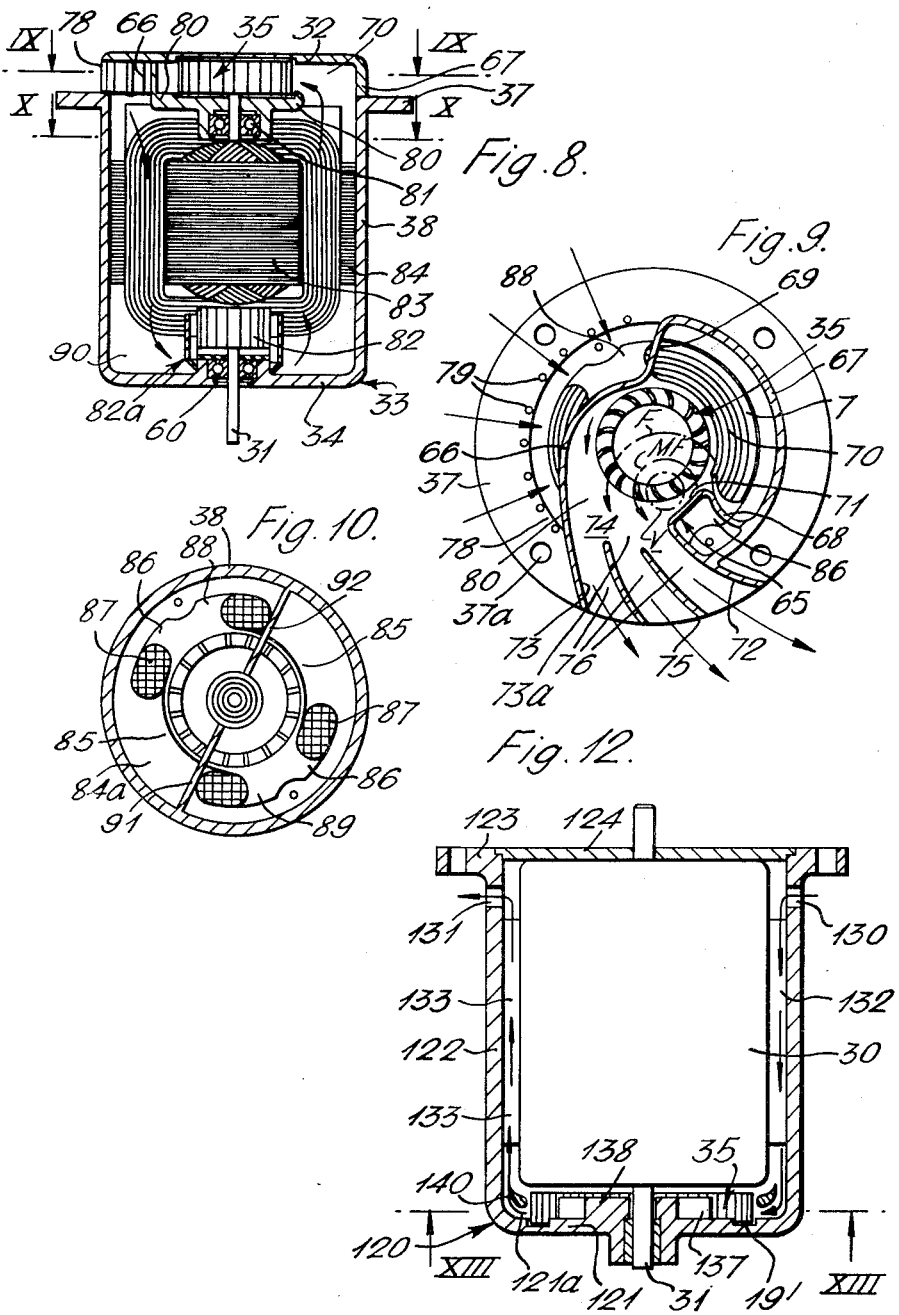

Jan. 4, 1966 N. LAING 3,227,902
ELECTRIC MOTOR COOLING MEANS
Filed March 7, 1963 4 Sheets-Sheet 4

INVENTOR
Nikolaus Laing
BY
ATTORNEYS

United States Patent Office 3,227,902
Patented Jan. 4, 1966

3,227,902
ELECTRIC MOTOR COOLING MEANS
Nikolaus Laing, Stuttgart, Germany, assignor, by mesne assignments, to Laing Vortex, Inc., New York, N.Y.
Filed Mar. 7, 1963, Ser. No. 263,647
Claims priority, application Germany, Dec. 7, 1956, L 26,392
14 Claims. (Cl. 310—59)

This invention relates to the cooling of electrical machinery, and more particularly (though not exclusively) small motors and the like and this application is a continuation-in-part of my application No. 701,600, filed December 9, 1957, now abandoned.

One common way of cooling small electric motors is to mount an axial fan on one end of the rotor and arrange for this fan to induce a flow or air generally axially over the motor. Small axial fans are normally inefficient, but quite apart from this it is not always desirable to have the inlet at one end of the motor and the outlet at the other.

The general object of the invention is to provide an electric machine with a simple and effective cooling arrangement wherein the inlet and outlet for cooling air are both situated at the same end of the rotor.

With this object in view the invention provides an electric machine having an outer casing which defines an air inlet at one end and an air outlet at the same end, a rotor within the casing mounted for rotation about a longitudinal axis, an impeller mounted within the casing coaxially with the rotor at one end thereof and for rotation therewith, said impeller comprising a series of blades disposed longitudinally of the rotor axis and arranged in a ring thereabout to define an interior space, guide means within the casing cooperating with the impeller on rotation thereof in a predetermined direction to induce a flow of air from an entry side of the impeller through the path of the rotating blades to said interior space and thence again through the path of the rotating blades to an exit side of the impeller, and means defining at least a pair of longitudinal ducts within said casing including an inflow duct for air flow from said one to said other end of the casing and an outflow duct for air flow from said other to said one end of the casing, the impeller being arranged in series with the inflow and outflow ducts between the inlet and the outlet whereby on rotation of the rotor and impeller, the latter sets up a flow of air from the inlet to the outlet which passes twice along the length of the casing.

This arrangement permits the bulk of the machine to be "submerged," as it were, in an apparatus with only the end portion having the inlet and outlet projecting. For example, a motor may thus be mounted on the switchboard, or other front panel member, of some apparatus. Notwithstanding the structure of the apparatus, the motor is adequately cooled without effect on the apparatus.

Because flow through the impeller takes place transversely of the rotor axis and because the axial length of the impeller can be relatively short the cooling arrangements according to the invention are economical of space. Other dispositions of the impeller are contemplated as will be seen from the following description. For example, in one construction, the impeller is mounted at the end of the rotor opposite the inlet and outlet, with the inflow duct running down one side of the casing from the inlet to the entry side of the impeller and the outflow duct running up the other side of the casing from the exit side of the impeller to the outlet.

The guide means may be such as to cooperate with the impeller to set up and stabilize a vortex of Rankine type having a core region interpenetrating the path of the rotating blades. Guide means such as just referred to will preferably lie outside the blades, the interior space within which is obstructed as little as possible. The Rankine vortex flow referred to has been found to be exceptionally efficient thus enabling a corresponding reduction of the impeller size.

The guide means may also take the form of one or more guide bodies of airfoil profile in cross-section located in the interior space defined by the blades. This arrangement can be used with advantage where a shaft would otherwise seriously obstruct flow through this space, since the shaft can conveniently be accommodated in the profile of the guide body or bodies.

Still another form of guide means comprises two sets of guide vanes disposed close about the envelope of the impeller blades over the entry and exit arcs.

In the electric machine according to the invention, the air path through the motor is double the length of the air path in a conventional arrangement where an axial fan induces a longitudinal flow of air over the motor. This air path naturally requires a greater pressure than the conventional path, and would be beyond the capacity of the axial fan ordinarily provided. In the embodiments of the invention using vortex flow the pressure is to some extent regulable, in design of the motor, by the divergence of the guide walls.

Because of the relatively efficient heat exchange between the motor and the cooling air by reason of the long air path mentioned, a higher than usual air temperature rise occurs, permitting reduced air throughput and leading to less dust in the motor, if the motor is not totally enclosed.

Further features and advantages of the invention will appear from the following description of certain preferred embodiments thereof given by way of example with reference to the accompanying somewhat diagrammatic drawings, in which:

FIGURE 3 is an axial section of a second motor the electrical parts whereof are totally enclosed in an inner casing shown only in elevation, the section plane being indicated at III—III in FIGURE 4;

FIGURES 4 and 5 are transverse sections of the second motor on planes indicated at IV—IV and V—V respectively in FIGURE 3;

FIGURES 6 and 7 are respectively an axial and a transverse setcion of a further small motor, the section plane of FIGURE 7 being shown in FIGURE 6 at VII—VII;

FIGURE 8 is an axial section of a fourth motor of commutator type;

FIGURES 9 and 10 are transverse sections, on planes indicated respectively at IX—IX and X—X in FIGURE 8, of the motor shown in FIGURE 8;

Figure 11:
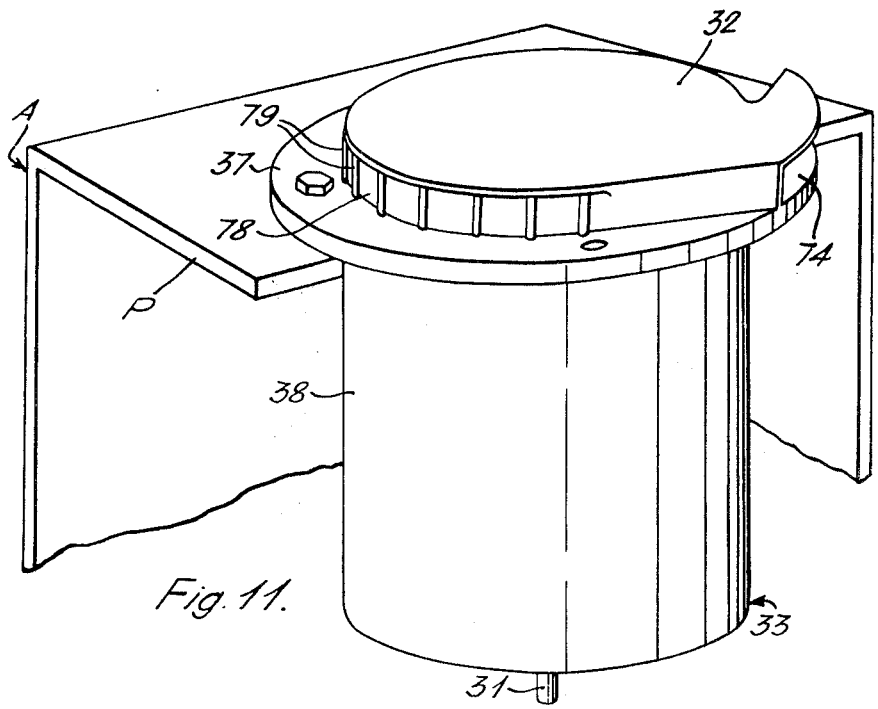
Figure 13:
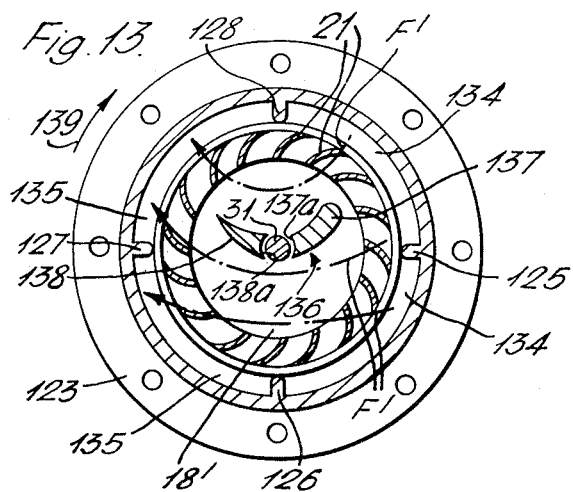

FIGURE 11 is a perspective view partly cut away illustrating the motor of FIGURE 8 mounted on a panel, and FIGURES 12 and 13 are respectively an axial and a transverse section of a fifth motor according to the invention, the electrical parts of the motor being housed in an inner casing shown only in elevation in FIGURE 12, and the section plane of FIGURE 13 being indicated at XIII—XIII in FIGURE 12.

Figure 1:
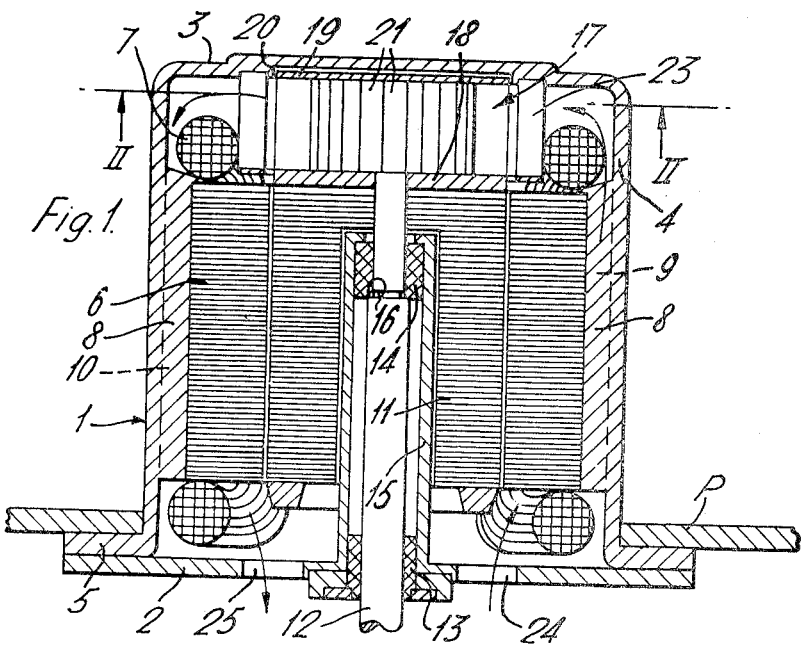
FIGURE 1 is an axial section of a small induction motor.

Referring to FIGURE 1 the motor there shown comprises a casing designated generally 1 having two end walls 2, 3 and a generally cylindrical wall 4. The end wall 3 and cylindrical wall 4 are integral, and the cylindrical wall is formed with an outwardly directed flange 5 to which the end wall 2 is secured after insertion within the casing 1 of a stator, rotor and air impeller to be described below. The flange allows the motor to be fixed to a panel P about an aperture therein through which the major part of the motor projects: thus apart from the end wall 2 the motor can be "submerged" in an apparatus enclosed by the panel P.

The motor includes a stator 6 having windings 7 and being supported in the casing 1 by longitudinal ribs 8 integral with and projecting inwardly from the casing wall 4, and defining passages 9, 10 between them. The motor further includes a rotor 11 mounted within the stator 6 upon a shaft 12 carried in axially spaced bearings 13, 14 of the sintered type. The bearings 13, 14 are mounted within a tube 15 integral with and projecting inwardly from the end wall 2 to a point near the further end of the rotor 11, the rotor having a bore to accommodate the tube with clearance. One bearing, 13, is secured adjacent the end wall 2 so as effectively to be supported thereon, while the other bearing lies at the further end of the tube 15. For convenience of endwise location the rotor shaft 12 is of reduced diameter where it extends through the bearing 14 and the rotor 11 beyond the tube, the shoulder 16 thus formed abutting an end of the bearing 14.

Figure 2:
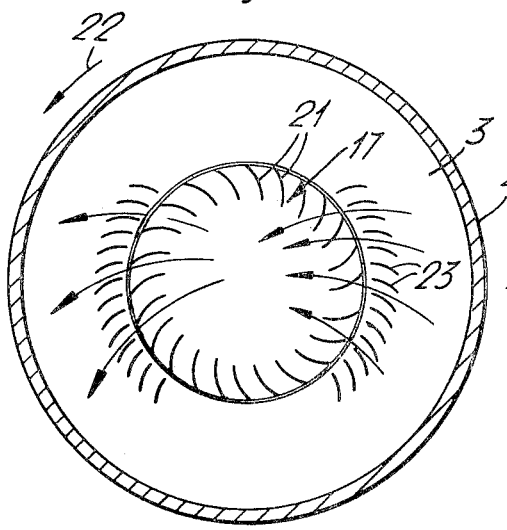
FIGURE 2 is a transverse section of the motor taken on the line II—II.

The extreme end of the shaft 12 projecting beyond the tube 15 carries an impeller designated generally 17 and comprising an end disc 18 secured at the end of the shaft, a coaxial parallel end disc 19 received in a recess 20 in the end wall 3 so as to present an inner surface flush with that of the wall 3, and blades 21 arranged in a ring and supported between the end discs. The blades 21 are concave facing the direction of rotation indicated by the arrow 22, with their outer edges leading. The impeller 17 co-operates with guide means in the form of stator blades 23 arranged over two arcs close outside the impeller and secured between end wall 3 and a mounting ring 23a on the adjacent end of the stator 6. The impeller 17 and stator blades 23 combine to form a blower producing an air flow as indicated in FIGURE 2, during operation of the motor.

The end wall 2 is formed with inlet and outlet apertures 24, 25, the first connecting with the longitudinal passages 9, and the second with the passages 10, flow between aperture 24 and passages 9 being separated from that between passages 10 and aperture 25 by a wall (not shown) extending inwards from the end wall 2 and serving also to rigidify the construction.

In operation the blower formed by impeller 17 and stator blades 23 induces a flow of air through inlet aperture 24, passages 9, impeller 17, passages 10 and outlet aperture 25. The air flows over the ends of the winding 7 and the outer surface of the stator 6 and cools them and at the same time cools the casing.

The guide means need not take the form of stator blades 23, but can instead be means such as shown in later figures.

The impeller 17 is preferably formed as a unit, and may be made of plastics. The blades 21 need not however form part of an impeller as shown at 17 but can be made of metal and secured in heat conducting relation to the rotor 11, whereby heat is conducted from the rotor to the blades and thence dissipated to the air.

The motor of FIGURES 3 to 6 has its electrical parts wholly enclosed within an inner generally cylindrical casing designated 30. A shaft 31 mounted in bearings (not shown) in the inner casing 30 extends therefrom upwardly (as the motor is illustrated) through the upper end wall 32 of an outer cylindrical casing designated generally 33. The upper end of inner casing 30 abuts the underside of the upper end wall 32, but the lower end of the inner casing 30 is spaced from the bottom end wall 34 of the outer casing 33 to define a chamber 30a which accommodates an impeller designated generally 35 mounted on the lower end of the motor shaft 31. The impeller 35 is similar in essentials to the impeller designated 17 of FIGURES 1 and 2 and the same numerals are used to denote corresponding parts, which will not require further description. As with the impeller 17, so the end wall 19 of impeller 35 is received in a recess 36 in the bottom end wall 34 of the outer casing.

At a short distance below its upper end wall 32 the outer casing 33 carries a radially extending circumferential flange 37 apertured at 37a for fixing screws (not shown) whereby the motor can be secured to a mounting panel indicated in chain dots at P. Below the flange 37 the cylindrical wall 38 of the casing 33 is imperforate. The upper end wall 32 of the outer casing 33 is supported on the casing wall 38 in spaced relation to the flange 37 on the upwardly projecting ends of four longitudinal partitions 39, 40, 41, 42 which extend radially inwardly from the casing wall over the length of the inner casing 30 and are oriented at 90° to one another. The projecting ends of partitions 40, 42 define with the end wall 32 and flange 37 an air inlet 43 to the interior of the casing 33 and also an air outlet 44 therefrom, as indicated by the arrows, both inlet and outlet having the form of an approximately semicircular slot. The partitions 40 and 42 define, with the wall 38 of the outer casing 33 and the inner casing, inflow and outflow ducts 45, 46 of semicircular shape in cross-section providing communication respectively between the inlet 43 and a region 47 for entry of air to the impeller 35, and between a region 48 for exit of air from the impeller, and the outlet 44.

The entry and exit regions 47, 48 are contained in the impeller chamber 30a and defined by the bottom wall 34 of the outer casing 33, the bottom of the inner casing 30, and a pair of curved walls 49, 50 extending between them towards the impeller 35 from the cylindrical wall 38 where such walls are aligned with and form continuation of the partitions 40, 42. In the exit region 48 the curved wall 50 provides a guide surface 51 converging with the impeller 35 in the direction of impeller rotation, as indicated by the arrow 52, to a line of nearest approach 51a appreciably spaced from the impeller. The wall 50 further provides in the exit region 48 a surface 53 merging with the guide surface 51 in a rounded nose 54. In the entry region 47 the wall 50 presents a lead-in surface 55 which for the most part is well spaced from the impeller 35, but turns sharply towards it adjacent the line 51a. The wall 49 in the exit region 48 presents to the impeller 35 a guide surface 56 which diverges steadily therefrom starting at a line of nearest approach 56a appreciably spaced from the impeller and approximately diametrally opposite the line 51a of nearest approach of the wall 50, the guide surface finally merging without discontinuity into the interior surface of the outer casing wall 38. Between the guide surface 56 and the nose 54 are two guide vanes 57 of airfoil profile which define between them, and with surfaces 56 and 53 a plurality of diffusing spaces 58.

On rotation of the impeller 35 in the direction of arrow 52, the blades 21 thereof cooperate with the guide surface 51 to set up a vortex of Rankine type having a core indicated by a peripheral flow line V thereof. A flow is induced through the impeller from the entry region 47 to the exit region 58 as indicated by the flow lines F, MF; the flow line MF, which is near the core V, has a much greater velocity than the flow lines remote therefrom. The characteristic curved flow pattern will be noted in that the main flow is turned through an angle approaching 180° in its passage through the region of the impeller 35. On leaving the impeller, the flow is somewhat slowed by the diffusing spaces 58, and the pressure increases; the vanes 57 assist in further turning the flow.

The particular flow pattern shown produces unusually good efficiencies where the flow takes place under conditions of low Reynolds numbers, which conditions apply to the cooling arrangements of small motors.

It will be apparent from the foregoing that in operation air is drawn in through inlet 43, passes down inflow passage 45 (which is divided but not obstructed by portion 39) passes thence to entry region 47, through impeller 35 to exit region 48, and thence flows up the outflow passage 46 to outlet 44. Inflow and outflow passages 45, 46, together with the impeller chamber 30a encompass virtually the whole external surface of the inner casing 30 and bring a continuous stream of outside air against it for cooling purposes.

The motor elements in inner casing 30 may be of any desired conventional type. The upper casing wall 32 is conveniently made separate from the remainder of the outer casing 33, as shown, so that, with the wall 32 removed, the inner casing 30 with the impeller 35 can be inserted within the outer casing and located therein by the walls 49, 50 and partition walls 39, 40, 41, 42.

Figure 5:
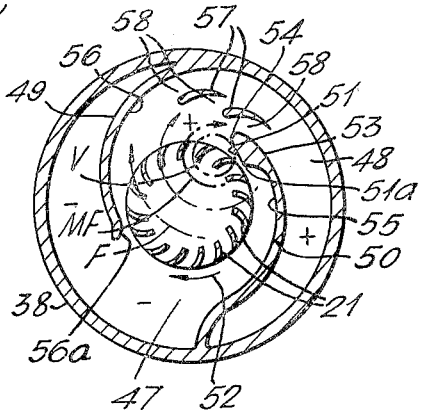

FIGURES 6 and 7 show a motor which in many respects is similar to that of FIGURES 3 to 5, and chiefly distinguished therefrom by having the cooling air impeller at the same end as the inlet and outlet, with the shaft projecting from the other end of the casing. Parts of the motor of FIGURES 6 and 7 which correspond to those of FIGURES 3 to 5 are given the same reference numerals and will not need further description. Only the differences between the two motors will be discussed.

In the motor of FIGURES 6 and 7 the inner casing 30 is once again spaced from the bottom wall 34 of the outer casing 33, but the chamber 30a so defined is without impeller and guide walls. The motor shaft 31 projects through the chamber 30a and through the bottom wall 34, being supported therein by a bearing 60 which replaces the lower bearing (not shown) in the inner casing 30 of FIGURES 3 to 5. The upper wall 61 of the inner casing 30 carries the upper bearing 62 for the motor shaft 31, and lies level with the flange 37 and spaced from the upper end wall 32 of the outer casing 33. The impeller 35 is mounted on the upper end of the shaft 31 with its end discs 18, 19 received with clearance in recesses 63, 64 in the walls 61 and 32. Guide walls 65, 66 project downwardly from the upper end wall 32 about the impeller 35, and join opposite ends of an upward extension portion 67 of the cylindrical wall 38 of the outer casing 33 which extension merges with the wall 32 over an arc of some 120°.

The guide walls 65, 66 include entry portions 68, 69 extending substantially from the cylindrical wall portion 67 radially towards the impeller 35 and defining, with the upper end wall 32 of the outer casing and the upper wall 61 of the inner casing, a region 70 of air entry to the impeller. The guide walls 65, 66 further comprise portions 71 and 72, and 73 corresponding to the guide surfaces 51 and 53, and 56 of the construction of FIGURES 3 to 5. The guide wall portions 72 and 73 diverge going away from the impeller 35 and define, with the upper wall 32 and a lower wall 73a coplanar with the flange 37 and inner casing wall 61, a region 74 for exit of air from the impeller; within this region a pair of guide vanes 75 forms with the surfaces 72 and 73, and between themselves, diffusing spaces 76. The formation of the guide wall portions 71, 72, 73 will be sufficiently understood from the previous description and the figures. As in the previous embodiment these wall portions cooperate with the impeller 35, on rotation thereof, to set up a flow indicated by the flow lines V, MF and F.

The motor of FIGURES 6 and 7, like that previously described, includes partitions 39, 40, 41 and 42 extending between the inner and outer casings 30, 33 in diametral planes at right angles; however, these partitions are not extended upward beyond the flange 37 as the support for the upper end wall 32 is provided by the walls 67, 65 and 66. The partitions 40 and 42 extend up to the upper wall 61 of the inner casing 30, the partition 40 merging with the guide wall portion 69 and the partition 42 abutting the underside of the lower wall 73a of the exit region 74. The partitions 39 and 41 terminate well below the upper wall 61 of the inner casing 30.

The flange 37 defines with the upper end wall 32 of the outer casing 33 an arcuate slot-like inlet 78 the arc of which is delimited by the surface of the guide wall 66 which faces away from the impeller, and extends over some 150°. Rods 79 extend longitudinally across the inlet 78 at intervals over the arc thereof to provide a grille preventing entry of foreign matter. The inlet 78 communicates directly with an inflow duct 45 defined by the cylindrical wall 38 of the outer casing 33, the corresponding wall of the inner casing 30 and the partitions 40, 42, as in embodiment of FIGURES 3 to 5. These casing walls and partitions define also, on the other side, an outflow duct 46 communicating directly with the entry region 70 to the impeller 35.

In operation of the motor flow takes place from the inlet 78, down the inflow duct 45, across the chamber 30a between the bottom end walls of the casings 30, 33, up the outflow duct 46 to the entry region 70 and thence through the impeller 35 to the exit region 74 which here constitutes the outlet. In passing through the diffusing spaces 76 the air from the impeller loses velocity and increases in static pressure, this increase in pressure being most desirable to overcome the resistance to flow in the path described.

The motors of FIGURES 3 to 7 have had their electrical elements totally enclosed. The motor of FIGURES 8 to 11 is a modification of that of FIGURES 6 and 7 wherein the inner casing 30 is omitted and air flow takes place past the electrical elements themselves. Again parts in FIGURES 8 to 11 which correspond to those of FIGURES 6 to 7 are given similar reference numerals, and only the differences between the two embodiments will be described in detail.

The outer casing 33, impeller 35 and cooperating guide walls 65, 66 correspond exactly to those of FIGURES 6 and 7, as do also the details of the inlet 78 and outlet region 74. The upper wall 61 of the inner casing 30 of the earlier embodiment is however replaced by a coplanar inward extension 80 of the flange 37 and the lower wall 73a of the exit region 74, this extension mounting the upper bearing 81 of the motor shaft 31, the lower bearing 60 of which is supported in the bottom wall 34 of the casing 33.

The motor of FIGURES 8 to 11 has a commutator, designated 82, mounted below the rotor 83 and cooperating with brushes indicated at 82a. The stator 84 is secured directly within the cylindrical wall 38 of the casing 33, and comprises a stack of annular laminations 84a (seen best in FIGURE 10) presenting opposed pole-piece portions 85 in close proximity to the rotor 83 and recesses 86 between them which are well-spaced from the rotor and accommodate the stator windings 87. The recesses 86 in the laminations 84a align on stacking to form inflow and outflow ducts 88, 89 on opposite sides of the rotor 83. Flow between these ducts takes place in the annular chamber 90 surrounding the commutator 82 and flow above the stator 84 is prevented by partition walls 91, 92 extending down from the walls 80 and 69 respectively towards the stator.

In operation, air enters the inlet 78 and passes down inflow passage 88, around the commutator 82 in chamber 90, up outflow passage 89 into the entry region 70 of the impeller 35, through the impeller and out through the outlet formed by the exit region 74.

FIGURE 11 shows the motor of FIGURES 8 to 10 mounted on the front panel P of an apparatus A so as to be "submerged" therein. Adequate motor cooling is ensured regardless of conditions within the apparatus, and without effect on them.

The external appearance of the motor of FIGURES 6 and 7 resembles that of FIGURES 8 to 10, so that FIGURE 11 can equally well be regarded as a view of the motor of FIGURES 6 and 7 installed in an apparatus.

The cooling arrangement of FIGURES 8 to 11 is particularly effective since air is brought into direct contact with large area surfaces of the rotor 83 and stator 84 as well as over the windings 87 thereon, and against the commutator 82 and brushes 82a.

FIGURES 12 and 13 show a further form of motor which is similar to that of FIGURES 3 to 5 except that the inlet and outlet are underneath the mounting flange and the guide means cooperating with the impeller differ from those previously described. Once again similar parts are designated by similar reference numerals and will hold no further description.

In the motor of FIGURES 12 and 13 the electrical parts are, as in FIGURES 3 to 5, housed in a cylindrical inner casing 30 itself enclosed in coaxial spaced outer casing 120: the casing 120 has the form of a cylindrical pot having a bottom wall 121, a cylindrical wall 122 with an external circumferential flange 123 at the top, and a closure wall 124 across the upper end of the pot, the upper end of the inner casing 30 abutting the closure wall 124 and its lower end defining with the bottom wall 121 a chamber 121a within which is mounted the impeller 35. Four partition walls 125, 126, 127 and 128 extend in diametral planes at right angles between the cylindrical wall 122 of the outer casing 120 and the corresponding wall of the inner casing 30: these partition walls extend from the bottom wall 121 of the outer casing 120 up to the closure wall 124 thereof. The cylindrical outer casing wall 122 is slotted just below the flange 123, the slots extending between the partition walls and providing an inlet 130 and an outlet 131, each extending over an arc of nearly 180° and being divided from one another by the other parts of the partition wall 126 and 128. Partition walls 126 and 128 define between them, with the cylindrical wall 122 of the outer casing 120 and the corresponding wall of the inner casing 30, an inflow duct 132 leading from the inlet 130 to the impeller chamber 121a and an outflow duct 133 leading from the chamber to the outlet 131. The partition walls 125, 126, 127 and 128, as seen in FIGURE 13, terminate in reasonably close proximity to the outer periphery of the impeller 35 and define therewith within the chamber 121a, an entry region 134 and an exit region 135, being in effect terminations of the ducts 132 and 133 respectively. Within the impeller 35 is situated a guide body designated generally 136 and having the form of an airfoil bent to increase the curvature normally present in the upper surface of an airfoil, the diametral plane containing partitions 126, 128 being approximately perpendicular to the chord of the airfoil. The guide body 136 is made up of three parts, the motor shaft 31, and two projections 137, 138 upstanding from an integral with the bottom wall 121 of the outer casing 120, the projections 137, 138 presenting concave surfaces 137a, 138a close to the shaft so as to minimize discontinuities presented to air flow over the guide body 136. To permit the guide body 136 to extend from the bottom of wall 121 within the rotor, the lower end disc 19 of the impellers of other embodiments here replaced by a ring 19′, which, though not shown, may run in an annular recess in the end wall.

In operation air flow takes place through the impeller chamber 121a as shown by the flow lines F¹ by reason of cooperation between the impeller blades 21, which rotate in the direction of the arrow 139, and the guide body 136. Air which has entered the inlet 130 and passed down the inflow duct 132 to the entry region 134 enters the interior space 140 within the impeller 35 through the path of the rotating blades 21. The air then passes again through the path of the rotating blades 21 to the exit region 135 and thence through the outflow duct 133 to the outlet 131.

To facilitate the change of direction of air flow in the entry and exit regions 134, 135 an annular guide body 140 is disposed in such regions with a cross-section (seen in FIGURE 12) of airfoil shape.

The guide body 136 may be preferred to the arrangement of FIGURES 3 to 11 in cases where it is necessary to pass a shaft through the impeller. This shaft would have a somewhat disturbing (though by no means necessarily fatal) influence on the vortex which the arrangements of FIGURES 3 to 11 produce and for which it is preferred that the interior of the impeller be completely clear. By contrast, the guide body 136 can incorporate the motor shaft, so that it has no disturbing influence on flow. In an alternative arrangement, the guide body can completely enclose the motor shaft and possibly also a bearing therefor. In larger motors it may be preferred to have two or more guide bodies of airfoil shaped like the guide body 136. The use of a guide body 136 permits a somewhat larger impeller.

I claim:
1. An electric machine having an outer casing which defines an air inlet at one end and an air outlet at the same end and is impervious to air except at said inlet and said outlet, a stator, a rotor within the casing mounted for rotation about a longitudinal axis, for electrical cooperation with the stator, an impeller mounted within the casing coaxially with the rotor at one end thereof and for rotation therewith, said impeller comprising a series of blades disposed longitudinally of the rotor axis and arranged in a ring thereabout to define an interior space, guide means within the casing cooperating with the impeller on rotation thereof in a predetermined direction to induce a flow of air from an entry side of the impeller through the path of the rotating blades to said interior space and thence again through the path of the rotating blades to an exit side of the impeller, and means defining at least a pair of longitudinal ducts within said casing including an inflow duct for air flow from said one to said other end of the casing and an outflow duct for air flow from said other to said one end of the casing, the impeller being arranged in series with the inflow and outflow ducts between the inlet and the outlet whereby on rotation of the rotor and impeller the latter sets up a flow of air, all of said flow passing from the inlet twice along the length of the casing to the outlet.

2. An electrical machine as claimed in claim 1, wherein said guide means includes a pair of arcuate walls extending from substantially diametrally opposite lines of nearest approach to said impeller to define said exit region, said walls at said exit region being curved in the same sense but diverging to provide a diffuser.

3. An electrical machine as claimed in claim 1, wherein the guide means includes a guide body of arcuate formation extending within the impeller.

4. An electric machine having an outer casing which defines an air inlet at one end and an air outlet at the same end, a stator, a rotor, a shaft mounting the rotor for rotation about a longitudinal axis, an impeller mounted on the shaft at the opposite end of the casing and within it with said impeller comprising a series of blades disposed longitudinally of the axis and arranged in a ring thereabout to define an interior space, guide means within the casing cooperating with the impeller on rotation thereof in a predetermined direction to induce a flow of air from an entry side of the impeller through the path of the rotating blades to said interior space and thence again through the path of the rotating blades to an exit side of the impeller, means defining within said casing including an inflow duct leading from the inlet to the entry side of the impeller and an outflow duct leading from the exit side of the impeller to the outlet.

5. An electric machine as claimed in claim 4, wherein said rotor and stator are mounted within an interior casing located within the outer casing in spaced relation thereto to define an annular chamber divided by at least two oppositely disposed partitions to form said inflow and outflow ducts, and an end chamber at said other end of the outer casing, said end chamber containing the impeller, and said guide means includes a pair of arcuate walls extending between the inner and outer casings in said end chamber to define said entry and exit sides of the impeller each arcuate wall forming a continuation of one of said partitions.

6. An electric machine as claimed in claim 4, wherein said stator is spaced from the outer casing to define said inflow and outflow ducts and an end chamber containing said impeller.

7. An electric machine as claimed in claim 4, wherein said outer casing comprises an end member mounting a first bearing for said shaft and supporting a tube projecting within said rotor about said shaft and carrying a second bearing for said rotor in spaced relation to the first bearing.

8. An electric machine as claimed in claim 4, comprising at least a pair of opposed ribs projecting inwardly from the outer casing over its length and supporting the stator in spaced relation thereto whereby to define an annular chamber divided by said ribs into said inflow and outflow ducts, the outer casing having an end wall at said one end thereof and a mounting flange at said one end but spaced from said end wall, the ribs extending beyond the flange and said flange and end wall defining with the ribs a pair of substantially semicircular slots providing said inlet and said outlet.

9. An electric machine as claimed in claim 4, wherein said guide means comprises a body of airfoil cross-section projecting into the interior space within the impeller and including within its profile said rotor shaft.

10. An electric machine having an outer casing which defines an air inlet and an air outlet at one end and which is impervious to air except at said inlet and said outlet, a rotor, a shaft mounting the rotor for rotation about a longitudinal axis, an impeller mounted on the shaft adjacent the outlet at said one end of the casing with said impeller comprising a series of blades disposed longitudinally of the axis and arranged in a ring thereabout to define an interior space, guide means within the casing cooperating with the impeller on rotation thereof in a predetermined direction to induce a flow of air from an entry side of the impeller through the path of the rotating blades to the interior space and thence again through the path of the rotating blades to the outlet, and means defining an inflow duct for air flow from the inlet to the other end of the casing and an outflow duct communicating with the inflow duct for air flow from said other end of the casing to the entry side of the impeller.

11. An electric machine as claimed in claim 10, wherein said outer casing has a peripheral mounting flange adjacent to but spaced from an end wall at said one end, a transverse wall extends partly across the interior of the casing in alignment with the flange, the impeller being mounted between the end wall and the transverse wall, said guide means including a pair of arcuate guide walls extending between the end wall and transverse wall, the end wall and flange defining with said guide walls a pair of slots providing said inlet and said outlet.

12. An electric machine as claimed in claim 10, wherein said inflow and outflow duct are defined between the stator and the rotor on opposite sides thereof.

13. An electric machine having an outer casing which defines an air inlet at one end and an air outlet at the same end, a stator, a rotor within the casing mounted for rotation about a longitudinal axis for electrical cooperation with the stator, an impeller mounted within the casing coaxially with the rotor at one end thereof and for rotation therewith, said impeller comprising a series of blades disposed longitudinally of the rotor axis and arranged in a ring thereabout to define an interior space, guide means within the casing cooperating with the impeller on rotation thereof in a predetermined direction to induce a flow of air from an entry side of the impeller through the path of the rotating blades to said interior space and thence again through the path of the rotating blades to an exit side of the impeller with said guide means including a plurality of spaced guide vanes extending parallel to the axis and close to the impeller and arranged in two groups one in said entry region and one in the exit region, and means defining at least a pair of longitudinal ducts within said casing including an inflow duct for air flow from said one to said other end of the casing and an outflow duct for air flow from said other to said one end of the casing, the impeller being arranged in series with the inflow and outflow ducts between the inlet and the outlet whereby on rotation of the rotor and impeller the latter sets up a flow of air from the inlet to the outlet which passes twice along the length of the casing.

14. An electric machine having an outer casing which defines an air inlet at one end and an air outlet at the same end, a stator, a rotor within the casing mounted for rotation about a longitudinal axis for electrical cooperation with the stator, an impeller mounted within the casing coaxially with the rotor at one end thereof and for rotation therewith, said impeller comprising a series of blades disposed longitudinally of the rotor axis and arranged in a ring thereabout to define an interior space, guide means within the casing cooperating with the impeller on rotation thereof in a predetermined direction to induce a flow of air from an entry side of the impeller through the path of the rotating blades to said interior space and thence again through the path of the rotating blades to an exit side of the impeller, and means defining at least a pair of longitudinal ducts within said casing including an inflow duct for air flow from said one to said other end of the casing and an outflow duct for air flow from said other to said one end of the casing, the impeller being arranged in series with the inflow and outflow ducts between the inlet and the outlet whereby on rotation of the rotor and impeller the latter sets up a flow of air from the inlet to the outlet which passes twice along the length of the casing; said rotor and stator being mounted within an interior casing located within the outer casing in spaced relation thereto to define an annular chamber and at least a pair of longitudinal partitions dividing said chamber to provide said inflow and outflow ducts.

References Cited by the Examiner
UNITED STATES PATENTS

| Re. 25,365 | 4/1963 | Eck | 230—125 |
| 1,808,845 | 6/1931 | Gifford | 310—58 |
| 1,920,952 | 8/1933 | Anderson | 230—125 |

O. L. RADER, *Primary Examiner.*

DAVID X. SLINEY, *Examiner.*